March 28, 1967  D. R. KIMBERLIN ETAL  3,310,993
PROGRESSIVELY ADJUSTABLE STEERING ASSEMBLY
Filed Feb. 23, 1965

INVENTORS
Dan R. Kimberlin &
BY Joseph A. Stearns

W. F. Wagner
ATTORNEY

United States Patent Office 3,310,993
Patented Mar. 28, 1967

3,310,993
PROGRESSIVELY ADJUSTABLE STEERING ASSEMBLY
Dan R. Kimberlin, Saginaw, and Joseph A. Stearns, Bridgeport, Mich., assignors to General Motors Corporation, Detroit, Mich., a corporation of Delaware
Filed Feb. 23, 1965, Ser. No. 434,217
13 Claims. (Cl. 74—493)

This invention relates generally to adjustment mechanism and more particularly, although not exclusively, to adjustable steering assemblies of the type in which the plane of rotation of the steering wheel is angularly displaceable through a predetermined range.

An object of the invention is to provide an improved zero lash linear displacement adjustment mechanism.

A further object is to provide an improved adjustable tilt steering wheel assembly.

Another object is to provide a tilt steering wheel assembly incorporating improved mechanism for regulating the angular positions of the steering wheel.

Yet another object is to provide a tilt steering wheel adjustment mechanism enabling progressive infinitely fine angular adjustment within a predetermined range.

A still further object is to provide a device of the stated character which is simple in construction, low in cost and efficient in operation.

These and other objects, advantages and features of the invention will become more readily apparent as reference is had to the accompanying specification and drawing wherein.

Figure 1:
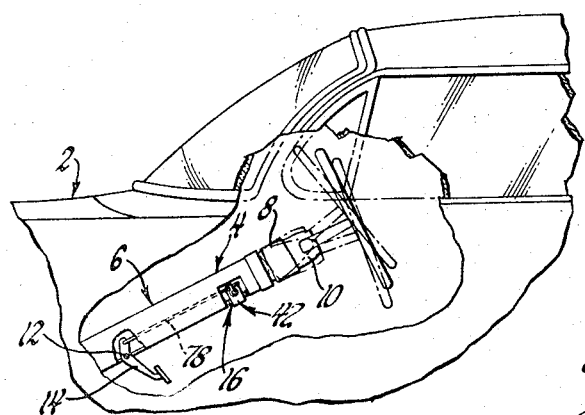
FIGURE 1 is a fragmentary plan view of a vehicle body, with parts broken away to illustrate the position and the general structural arrangement of a tilt steering wheel assembly in accordance with the invention.

Referring now to the drawing and particularly FIGURE 1, there is shown a fragmentary portion of a vehicle body 2 with a part thereof broken away to illustrate the general structure and position of steering assembly 4. Assembly 4 includes a fixed lower column section 6, an upper jacket 8 adapted for tilting movement relative to column 6 about a transverse axis, and a steering wheel 10 rotatable in a plane perpendicular to the axis of inclination of the jacket 8. Mounted on column 6 near the lower end thereof by a trunnion 12 is a pendant foot pedal 14 operable to release a normally locked mechanism 16 which in turn regulates the angular position of jacket 8 relative to column 6.

Figure 2:
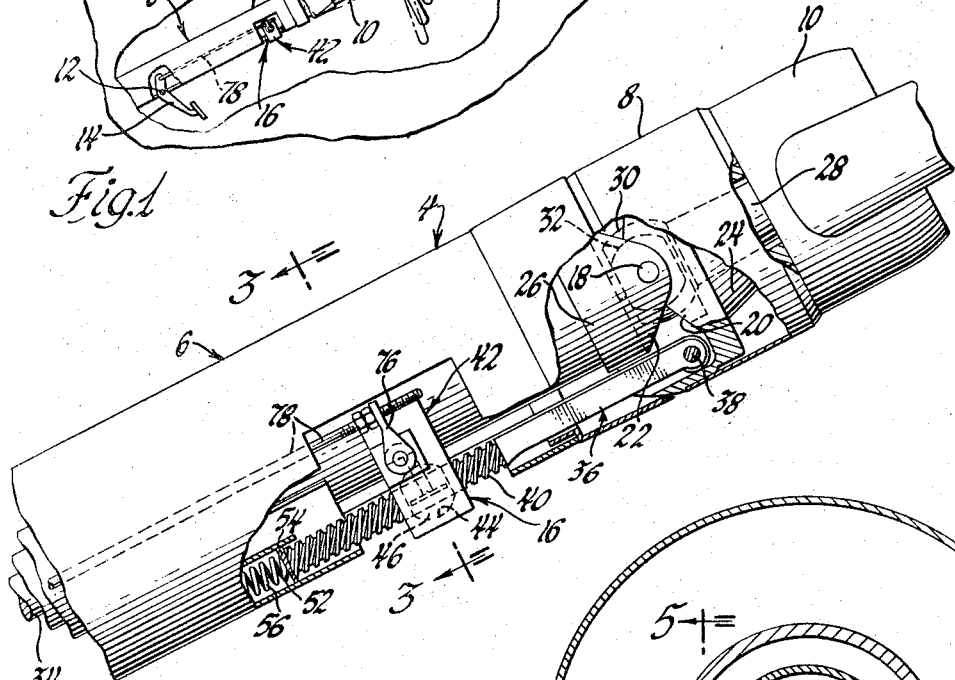
FIGURE 2 is a partially sectioned side elevational view, with parts broken away, showing details of the assembly.

As seen best in FIGURE 2, jacket 8 is pivotally secured to the upper end of column 6 by means of transversely extending trunnions 18 which project through apertured laterally spaced pairs of ears 20 and 22 formed respectively on an upper housing 24 disposed within jacket 8 and a lower housing 26 disposed within column 6. Steering wheel 10 in turn is keyed to a rotatable stub shaft 28 extending downwardly through housing 24 and terminating in a yoke 30 which surrounds a cross-slotted ball 32 located laterally between ears 20 and 22 and having a geometric center aligned with trunnions 18. A lower steering shaft 34 similarly engages cross-slotted ball 32 and is rotatably supported in column 6. Inasmuch as the yoke connections of steering shafts 28 and 34 with slotted ball 32 provide a universal drive connection coincident with the transverse axis of trunnions 18, it will be evident that jacket 8 and steering wheel 10 may be angularly disposed relative to the axis of column 6 and yet maintain last free rotational driving engagement between the steering wheel 10 and steering shaft 34.

In order to adjust and maintain jacket 8 and wheel 10 in any position within the range of angular displacement above and below axial alignment with column 6, a rod 36 disposed partly in column 6 and partly in jacket 8 is connected at its upper end to housing 24 by a transversely extending pivot 38, while the lower end thereof is formed with a high lead threaded portion 40 (for example, standard Acme threads, ten to the inch) which extends into and projects through a cage assembly 42 supported on column 6. In accordance with the present invention, the linear position of rod 36 relative to cage 42 is susceptible to infinitely fine adjustments on a continuous or progressive basis which enables optimum selectivity of the angular position of the steering wheel within the maximum range of movement. To this end, cage assembly 42 is formed with an internal parti-spherical socket 44 in which is disposed a mating spherical or ball type nut 46. Nut 46 is provided with a bore 48 having internal threads 50 cooperating with the threaded lower end portion 40 of rod 36 which extends completely therethrough. Throughout the normal range of linear displacement of rod 36, the terminal extremity 52 thereof abuttingly engages a wedge plate 54 and caged compression spring 56 which counterbalances the tendency of the tilting portion of the steering assembly to swing downwardly under its own weight.

With the construction shown, it will be evident that due to the high lead threads utilized in the rod and ball connection, linear displacement of the rod will induce rotation of ball 46 within cage 42 in the absence of significant frictional engagement therebetween, while establishment of substantial frictional engagement therebetween will prevent such rotation and positively lock the rod in a fixed linear position relative to housing 6. To accomplish and control establishment and release of such frictional engagement in accordance with the invention, the cage 42 is formed of a fixed upper section 58 and a displaceable lower section 60 which are normally biased into clasping engagement with the spherical outer surface of the ball by a caged compression spring 62 acting on a ledge portion 64 of lower section 60. Extending through upper section 58 and disposed in linear alignment with the axis of compression spring 62 is a plunger 66 having a lower end 68 abutting ledge 64 and an upper end 70 abutting a rotary cam member 72 journalled in upper section 58 on a transverse axis 74. Cam member 72 in turn is formed with a lever element 76 which operatively engages one end of a rod 78, the other end of which is connected to pendant pedal 14 at a point on the latter whereby downward swinging movement of the pedal overcomes the biasing force of spring 62 to release gripping engagement between cage socket 44 and ball 46, while release of the pedal permits spring 62 to restore the frictional gripping engagement. In order to further enhance the frictional engagement obtained and compensate for wear during the service life of the device, ball 46 is preferably formed with a single slot 80 extending completely therethrough so that contracting pressure exerted by the cage on the outer periphery of the ball causes the latter to contract so that the internal threads tightly engage the external threads of rod 36.

Figure 3:
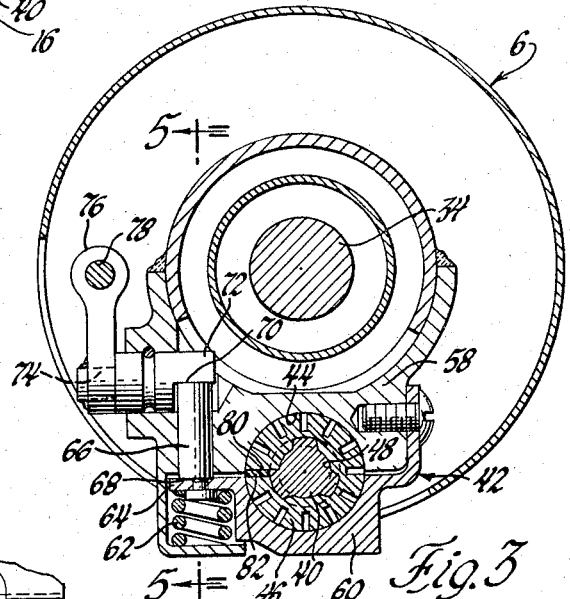
FIGURE 3 is a greatly enlarged sectional end elevation showing details of mechanism utilized in establishing and maintaining adjusted positions of the tilting portion of the assembly.
Figure 4:
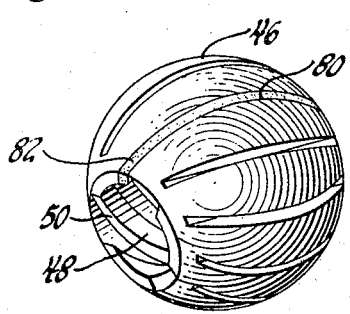
FIGURE 4 is a perspective view of an element of the adjustment mechanism.
Figure 5:
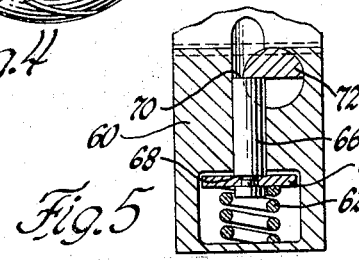
FIGURE 5 is a view looking in the direction of arrows 5—5 of FIGURE 3.

In operation, the device functions in the following manner. When the vehicle operator wishes to initially adjust or readjust the angular plane of steering wheel 10, foot pressure is applied to pedal 14 sufficient to overcome the biasing force of compression spring 62. While the pedal remains depressed, the operator grasps the wheel and tiltably inclines it to the desired angular position, during which operation the rod 36 is linearly displaced upwardly or downwardly relative to cage 42 due to its pivotal connection with housing 24. Since frictional resistance between ball 46 and socket 44 is relieved, this progressive linear displacement induces rotation of ball 46 within socket 44. When the desired angular position of the wheel has been achieved, foot pressure on pedal 14 is released and spring 62 restores sufficient frictional engagement between socket 44 and ball 46 to prevent any further rotation of the latter causing the linear position of rod 36 to remain fixed and consequently similarly positively establishing the angular plane of wheel 10. Of particular importance in the present invention is the fact that regulation of the angular position of the steering wheel is not limited to a relatively few angular increments but rather may be accomplished on an infinite fine progressive basis. In addition, it is also to be noted that by forming the ball 46 with the slot 80 enabling contraction thereof relative to the threads 40 of rod 36, when the mechanism is in a locked position, any possibility of end play or chucking is totally eliminated, since the compressive loading exerted by spring 62 also causes the internal threads of the ball to take up any play that might otherwise exist in between the threaded elements. In this construction, while the natural elasticity of the ball tends to produce spring back when compressive loading is relieved, this action may be further assured by interposing a thin elastic shim element 82 in slot 80, as shown in FIGURE 3.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. A locking device comprising, an internally threaded spherical member, a cage forming a spherical socket embracing said spherical member, an axially movable nonrotatable rod threadably engaging said spherical member, and means associated with said cage selectively operative to induce and relieve frictional engagement between said spherical member and said cage.

2. In a device of the class described, a locking mechanism comprising, a fixed cage having a spherical socket formed therein, a spherical nut rotatably disposed in said cage, a rod extending through said nut and engaged therewith by mating threads of sufficiently high lead so that axial movement of said rod induces rotation of said nut, biasing means associated with said cage effective to provide frictional engagement between said cage and nut preventing rotation of said nut, and means operable to disable said last mentioned means.

3. In a device of the class described, a locking mechanism comprising, a fixed cage having a truncated spherical socket formed therein, a truncated spherical nut rotatably disposed in said cage, a rod extending through said nut and engaged therewith by mating threads of sufficiently high lead so that axial movement of said rod induces rotation of said nut, yieldable biasing means associated with said cage effective to provide frictional engagement between said cage and nut preventing rotation of said nut, and means operable to disable said last mentioned means.

4. In a device of the class described, a locking mechanism comprising, a fixed split cage having a truncated spherical socket formed therein, a truncated spherical nut rotatably disposed in said cage, a rod extending through said nut and engaged therewith by mating threads of sufficiently high lead so that axial movement of said rod induces rotation of said nut, yieldable biasing means associated with said cage effective to provide frictional engagement between said cage and nut preventing rotation of said nut, and means operable to disable said last mentioned means.

5. In a device of the class described, a locking mechanism comprising, a fixed split cage having a spherical socket formed therein, a spherical nut rotatably disposed in said cage, a rod extending through said nut and engaged therewith by mating threads of sufficiently high lead so that axial movement of said rod induces rotation of said nut, yieldable biasing means urging said split cage socket into gripping engagement with said nut sufficient to prevent rotation thereof, and positive acting means operable to overcome said biasing means to enable rotation of said nut.

6. The structure set forth in claim 5 wherein said nut is split so that the internal threads thereof grippingly engage the external threads of said rod coincident with gripping engagement between said spherical socket and nut.

7. The structure set forth in claim 6 wherein the abutting edges of said split nut are separated by an elastic strip.

8. The structures set forth in claim 5 wherein said yieldable biasing means is a compression spring and said positive acting means in a cam actuated plunger.

9. An adjustable steering assembly comprising, a fixed lower column section, an upper column section operatively connected to said lower section for movement in a defined path relative thereto, a rotatable nut, a cage formed on one of said sections surrounding said nut, a nonrotatable rod connected at one end to the other section and extending through said nut, said nut and rod being connected together by mating threads of sufficiently high lead so that axial displacement of said rod relative to said nut induces rotation of the latter in said cage, and means associated with said cage for selectively enabling and preventing rotation of said nut.

10. An adjustable steering assembly comprising, a fixed lower column section, an upper column section operatively connected to said lower section for angular movement relative thereto, a rotatable nut, a cage formed on one of said sections surrounding said nut, a nonrotatable rod connected at one end to the other section and extending through said nut, said nut and rod being connected together by mating threads of sufficiently high lead so that axial displacement of said rod relative to said nut induces rotation of the latter in said cage, and means associated with said cake for selectively enabling and preventing rotation of said nut.

11. An adjustable steering assembly comprising, a fixed lower column section, an upper section operatively connected to said lower section for angular movement relative thereto, a rotatable nut, a cage formed on said lower section surrounding said nut, a nonrotatable rod pivotally connected at one end to said upper section and extending through said nut, said nut and rod being connected together by mating threads of sufficiently high lead so that axial displacement of said rod relative to said nut induces rotation of the latter in said cage, and means associated with said cage for selectively enabling and preventing rotation of said nut.

12. An adjustable steering assembly comprising, a fixed lower column section, an upper column section operatively connected to said lower section for movement in a defined path relative thereto, a rotatable nut, a split cage formed on one of said sections surrounding said nut, a rod connected at one end to the other section and extending through said nut, said nut and rod being connected together by mating threads of sufficiently high lead so that axial displacement of said rod relative to said nut induces rotation of the latter in said cage, and yieldable biasing means associated with said cage effective to provide frictional engagement between said cage and nut preventing rotation of said nut, and remotely operable means for disabling said last mentioned means.

13. The structure set forth in claim 12 including yieldable biasing means urging said rod in one direction relative to said cage.

References Cited by the Examiner
UNITED STATES PATENTS

| | | | |
|---|---|---|---|
| 2,983,159 | 5/1961 | Zeligowski et al. | 74—531 X |
| 3,245,282 | 4/1966 | Kimberlin | 74—493 |

MILTON KAUFMAN, *Primary Examiner.*

UNITED STATES PATENT OFFICE
CERTIFICATE OF CORRECTION

Patent No. 3,310,993                            March 28, 1967

Dan R. Kimberlin et al.

It is hereby certified that error appears in the above numbered patent requiring correction and that the said Letters Patent should read as corrected below.

Column 2, line 12, for "last" read -- lash --; column 4, line 32, for "structures" read -- structure --; line 34, for "in" read -- is --; line 57, for "cake" read -- cage --; line 60, for "an upper section" read -- an upper column section --.

Signed and sealed this 7th day of November 1967.

(SEAL)

Attest:

Edward M. Fletcher, Jr.                        EDWARD J. BRENNER

Attesting Officer                              Commissioner of Patents